United States Patent [19]

Bezeau, Jr.

[11] Patent Number: 5,029,507

[45] Date of Patent: Jul. 9, 1991

[54] CHORD PROGRESSION FINDER

[75] Inventor: Robert A. Bezeau, Jr., Mt. Clemens, Mich.

[73] Assignee: Scott J. Bezeau, Mt. Clemens, Mich.

[21] Appl. No.: 528,931

[22] Filed: May 29, 1990

Related U.S. Application Data

[63] Continuation-in-part of Ser. No. 273,237, Nov. 18, 1987, Pat. No. 4,969,383.

[51] Int. Cl.$^5$ .............................................. G09B 15/00
[52] U.S. Cl. ................................. 84/485 S R; 84/473
[58] Field of Search ................. 84/471 S R, 473, 478, 84/480, 485 S R; 235/70 A, 70 R

[56] References Cited

U.S. PATENT DOCUMENTS

| | | | |
|---|---|---|---|
| 422,964 | 3/1890 | McTammy | 84/485 R |
| 2,001,191 | 5/1935 | Golden | 84/485 S R |
| 2,663,211 | 12/1953 | Wallace | 84/485 S R |
| 2,824,479 | 2/1958 | DeRosa | 84/482 |
| 3,245,303 | 4/1966 | Patt | 84/485 R |
| 3,668,967 | 6/1972 | Malis | 84/471 |
| 3,691,895 | 9/1972 | Nessler | 84/471 |
| 3,728,931 | 4/1973 | Leonard | 84/471 R |
| 3,894,465 | 7/1975 | Simmons | 84/485 S R |
| 4,069,735 | 1/1978 | Bertram | 84/471 |
| 4,237,766 | 12/1980 | Marshall | 84/377 |
| 4,503,748 | 3/1985 | Barber | 84/474 |

FOREIGN PATENT DOCUMENTS 8401845 5/1984 World Int. Prop. O. ...... 84/485 SR

OTHER PUBLICATIONS

"Musical Merchandise Review", vol. 137, No. 11, Nov. 1978, pp. 30–31.

Primary Examiner—L. T. Hix
Assistant Examiner—Howard B. Blankenship
Attorney, Agent, or Firm—Peter D. Keefe

[57] ABSTRACT

A chord progression finder for determining each and every tone of a selected musical scale in a selected key note and each and every tone of its relative musical scales, as well as the various chords playable for the selected musical scale and its relative scales, while simultaneously providing information on which keys or frets of a musical instrument are to be played for producing the indicated tones. A base has printed information pertaining to a particular musical instrument and also fingering patterns for playing tones on that instrument arranged in a predetermined sequence indicative of any number of desired musical scales. A slidable, transparent first overlay is slidably connected with the base, and has printed thereon the letter designations for the muscial tones arranged in a predetermined sequence so as to cooperate with the fingering patterns on the base in order to selectively indicate to a user the finger positions on the subject musical instrument that will produce the tones of a selected musical scale and its relative scales. A slidable, transparent second overlay is also slidably connected with the base, and has thereon indicia indicative of chord numbers arranged in a predetermined numeric sequence. The base and the first overlay cooperate with the second overlay to indicate to the user the tones and finger positions on the subject musical instrument that will produce the specific chord voicings of the selected scale and its relative scales. These chords can then be used to form chord progressions, as the user may thereupon select.

19 Claims, 6 Drawing Sheets

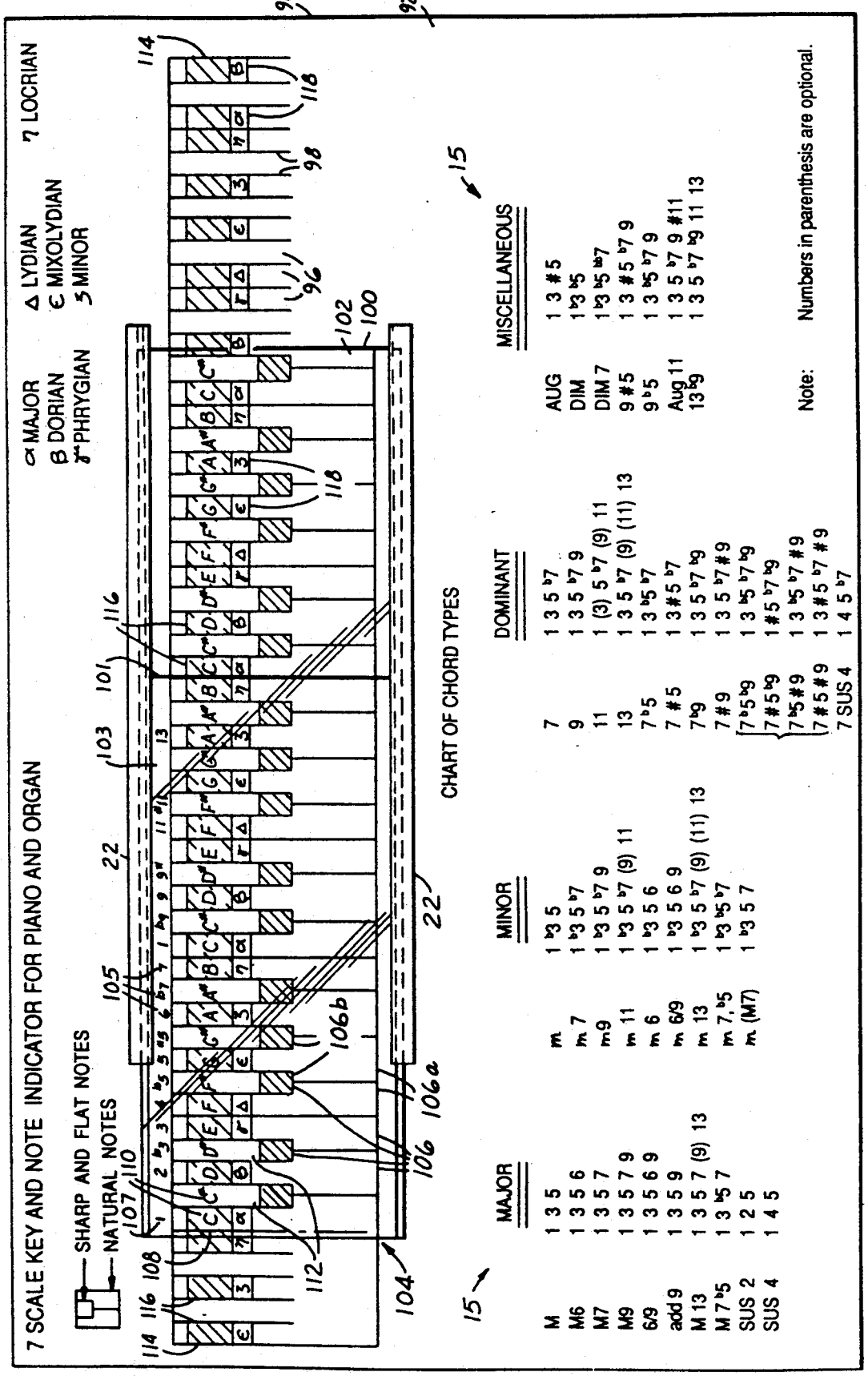

CHORD PROGRESSION FINDER

CROSS-REFERENCE TO RELATED APPLICATIONS

The present application is a continuation-in-part application of co-pending U.S. patent application Ser. No. 07/273,237, filed Nov. 18, 1987, which is now U.S. Pat. No. 4,969,383.

BACKGROUND OF THE INVENTION

1. Field of the Invention

The present invention relates to devices for indicating musical notes and chords. More particularly, the present invention is a device for indicating musical notes playable for any musical chord types in any musical scale with said notes being visually associated with the finger boards used to play selected musical instruments.

2. Description of the Prior Art

A. Music Theory, Musical Scales, Chord Types, and Musical Instruments

There are many different styles of music. But, every style of music is based upon a predetermined progression of tones. Tones, or notes, are variations in pitch (sound frequency) produced by a musical instrument. It has become customary to refer to these tones by seven letter designations: A, B, C, D, E, F, and G. When these tones, or notes, repeat, as in A B C D E F G A, then the interval between the first and last tones is known as an octave. The sound frequency difference between tones is given in "steps", and the steps between each of the tones A, B, C, D, E, F, and G is not the same. There is a half-step interval between tones B and C, and between tones E and F, while there are whole-step intervals between A and B, C and D, D and E, and F and G. Each tone may be raised or lowered one-half step; these are known as the accidentals of the tone, and they are represented by a "#" sign for "sharps", which raise the tone one-half step, and represented by a "b" sign for "flats", which lower the tone one-half step. The Chromatic Scale, from which all music derives, is based upon the natural tones, A, B, C, D, E, F, and G (the white piano keys), as well as upon the accidentals F#, G#, A#, C# and D# (the black piano keys).

In any melody, there is one tone which seems to dominate and be more final than any other tone. If a musical melody is played without finishing on this tone, the melody appears to the ear as somehow incomplete. This central tone is called the "tonic", or "key note". Each tonic has a set of tones which are related to it in varying degrees. When a musical score begins on a certain tone, it can be expected that certain selected tones will follow. These groups of tones, which relate to the concept of "tonality", constitute the musical "scales".

Over the years a number of musical scales have been developed, as follows.

By the seventeenth century, the following scales (or modes) were in use:

| | |
|---|---|
| A B C D E F G A | known as Aeolian; |
| B C D E F G A B | known as Locrian; |
| C D E F G A B C | known as Ionian; |
| D E F G A B C D | known as Dorian; |
| E F G A B C D E | known as Phrygian; |
| F G A B C D E F | known as Lydian; and |
| G A B C D E F G | known as Mixolydian. |

The Major scale, like Ionian Mode, is based upon a succession of eight tones modeled on the tone intervals, or steps, when the succession of tones begins on C. These intervals are: C-D, D-E, E-F, F-G, G-A, A-B, and B-C; constituting steps which are: whole, whole, half, whole, whole, whole, and half. This scale is known as the "C Major Scale". Major scales beginning on other tones may be constructed, always with the steps between the third and fourth tones and the seventh and eighth tones being half steps. This is accomplished by selectively utilizing the accidentals A#, B#, C#, D#, E#, F# and G#, and Ab, Bb, Cb, Db, Eb, Fb and Gb instead of the naturals A, B, C, D, E, F, and G, as necessary to achieve the intervals, or steps, of the C Major Scale. For instance, the Major Scale beginning on G is constructed as follows: G A B C D E F# G.

The Minor Scale, like the Aeolian Mode, is based upon a succession of eight tones modeled on the tone intervals, or steps, when the succession of tones begins on A. These intervals are: A-B, B-C, C-D, D-E, E-F, F-G, and G-A; constituting steps which are: whole, half, whole, whole, half, whole, and whole. As in the Major Scale, the Minor Scale can be constructed so as to begin on any tone with the intervals between tones being those of A minor, by using the appropriate accidentals of the tones where required.

The foregoing Minor Scale description is known as the "Natural Minor Scale". There are two main variations of the Minor Scale. The "Harmonic Minor Scale" is an adaption of the Minor Scale for harmonic purposes in certain melodies. The Harmonic Minor Scale raises the seventh step so that there is a half-step difference between the seventh and eighth steps of the octave. The intervals are: A-B, B-C, C-D, D-E, E-F, F-G#, and G#-A; constituting steps which are: whole, half, whole, whole, half, one and one half, and half. The "Melodic Minor Scale" additionally raises the sixth step when the melody is ascending, but the sixth and seventh degrees are restored to the natural when the melody is descending. The intervals when ascending are: A-B, B-C, C-D, D-E, E-F#, F#-G#, and G#-A; constituting steps which are whole, half, whole, whole, whole, whole and half.

It will be noted from the foregoing discussion that a scale in a particular key note is related to other scales in other key notes. Thus, for instance, "C Locrian" is related to its relative scales: "F Phrygian", "F-Sharp Lydian", "G-Sharp Mixolydian", "A-Sharp Minor", "C-Sharp Major" and "D-Sharp Dorian".

A "scale" is a sequential series of tones which is established under the principle of tonality. In contradistinction to this is the concept of the "chord", which is the simultaneous playing of more than one tone. Thusly, when playing the scale a musician plays each note singly per beat, while when playing a chord the musician plays several notes simultaneously per beat. Generally, songs combine playing of scale notes by a soloist and playing of chord progressions by a rhythm player, where the scale notes are used for making solos for harmonies, and the chord progressions are used for melody background.

There are many different variations of chords, each being determined by the simultaneous combined playing of two or more different tones (or notes). A chord is constituted usually by two to five notes taken from the chromatic scale. The choice of notes for a chord is determined by the interval or intervals between the notes on the basis that they collectively produce a desired sound.

The method for selecting chords from the chromatic scale is accomplished using a chord number system in which tones (or notes) of a selected musical scale are assigned specific numbers. The tones, numbers are respectively: C, 1; C#, ♭2; D, 2; D#, ♭3; E, 3; F, 4; F#, ♭5; G, 5; G#, #5; A, 6; A#, ♭7; B, 7; C, 8 or 1; C#, ♭9; D, 9; D#, #9; E, 10; F, 11; F#, #11; G, 12; G#, ♭13; A, 13; A#, #13; B, 14.

The unique voicings of the notes thus selected are then categorized into their proper families of Major, Minor and Dominant.

All chords mainly have one root (or key note) and a 5th note, but these may be omitted from the chord because the chords are separated into the chord families by the characteristics of the 3rd and 7th tones (or notes) of the chord. Major Chords have the Major 3rd and Extended Major Chords have the Major 7th. Minor Chords have the Minor ♭3rd and Minor ♭7th. Dominant Chords have the Major 3rd and Minor ♭7th. Finally, Augmented and Diminished Chords are considered and used as the Dominant family of chords. This method is also used in order to categorize the scales into their proper families of Major, Minor and Dominant. Once the scales and chords have been placed into their rightful families of Major, Minor and Dominant, then it is easier for the musician to use the right chord to play for the right scale in which is achieved a harmony between the scales and the chords.

There are four basic families of musical instruments: stringed, brass, woodwinds and percussion. In each family, individual instruments have unique fingerboard positions which are required in order for the musician to produce desired tones from the instrument. As an example of a percussion instrument, the piano keyboard spans seven octaves, each octave having 12 keys, 7 white (representing naturals) and 5 black (representing accidentals).

B. Prior Art Devices to Aid Musicians

Clearly, with the extreme complexity of the musical system which has evolved over the centuries, and the additional complexities associated with particular instrument fingerboards, the beginning musician has a most difficult task on his way to musical proficiency.

In the prior art there are various attempts at making this task somewhat easier.

U.S. Pat. No. 422,964 to McTammany discloses a mechanical indicator having a base and a selectively apertured overlay, the overlay apertures cooperate with the base to indicate finger positions and blow action required by an apprentice musician who is learning to play particular songs on a brass or woodwind instrument. The overlay must be perforated for each particular tune to be played.

U.S. Pat. No. 2,001,191 to Golden discloses a chord finder for banjos composed of a top member, a bottom member and a sliding member therebetween. The top member has three rectangular slots; the bottom member has three sets of tones, each positioned to fit under a rectangular slot and arranged in groups of four across (representing the four strings of the banjo fret board). The first set represents the major chords, the second represents the minor chords and the third represents the "seventh chords". The sliding member is apertured to show finger positions necessary to play the desired chords on the instrument.

U.S. Pat. No. 2,663,211 to Wallace discloses a piano key indicator which is placed adjacent to the keys of a piano in order to teach a student the fingering positions in order to play scales on the instrument. The device has a rectangular member having windows and has a sliding member with finger numbering thereon. The sliding member is moved so that the student can see the fingering position for playing the major and minor scales in any key.

U.S. Pat. No. 3,245,303 to Patt discloses a device to teach finger positions for fretted string instruments. The device has a series of pages having a plurality of dots thereon. An overlay having a grid pattern representative of the fretboard of a guitar is placed over the sheets, whereupon the dots serve to indicate fingering positions of the notes used to make a specific chord. The upper portion of the overlay has a vertical column of the chromatic scale, which when a tone is placed over a square on the sheet, the finger positions indicated for the chord type on that sheet is playable in that key.

U.S. Pat. No. 3,728,931 to Leonard discloses an interval measuring device composed of a holder having printed thereon a chromatic scale and a slider (one for major and one for minor scales) which slides on the holder. Since the intervals of each scale are preset by convention, the holder has printed thereon the chromatic scale and the slider has printed thereon the tones of the scale separated according to the intervals as preset by the aforesaid convention. By sliding the slider, the scale tones can be readily determined for any root tone.

U.S. Pat. No. 3,894,465 to Simmons discloses a chord finder for the guitar. A slidable member has printed thereon a simulated fret board, with accompanying notation, such as note indications. A stationary member in which the slidable member has windows through which the simulated fret board may be seen. The windows have markings thereon to show finger positions as the slidable member is slid to various positions for selection of various chords.

U.S. Pat. No. 2,824,479 to DeRosa discloses a two layer slide rule which is to be placed adjacent the keys of a piano. One layer has a plurality of holes, the other has a plurality of indicator indicia. Alignment of the holes and indicator indicia show playable chords on the adjacent piano keys.

U.S. Pat. No. 3,668,967 to Malis discloses a three layer slide rule, each layer having indicia, where one layer is a simulated fingerboard. The other two layers have a plurality of spots on them. Movement of the other two layers causes the spots to align with predetermined characters on the fingerboard, the characters corresponding to notes. Thus, notes in a preselected chord are identified, as well as their positions on the fingerboard.

U.S. Pat. No. 3,691,895 to Nessler discloses a three layer slide rule having indicia on each layer, one being a simulated fingerboard. The device shows: (1) a selected chord and notes in that chord, as well as the chord's three chord inversions, (2) a particular scale and its notes on the fingerboard, and (3) the common chord progressions for that scale.

U.S. Pat. No. 4,069,735 to Bertram discloses a circular slide rule having five layers, with indicia on each. The slide rule of Bertram shows: (1) the key signature for the Major and Minor scales, (2) the number of sharps and flats in that signature, (3) letter notes on the Major scale and its five diatonic scales when placed in a selected position, such as C Major, C Minor, C Dorian, C Phrygian and C Mixolydian, (4) the basic, I, IV and V chord progressions, and (5) information on whether the three chord progressions are Major, Minor or diminished.

U.S. Pat. No. 4,237,766 to Marshall discloses an harmonica device having two reeds and cavities with specific blow/draw patterns. The blow/draw patterns is of a certain scale and the particular patterns specify certain specific chords of that scale.

U.S. Pat. No. 4,503,748 to Barber discloses a two layer circular slide rule. The top sheet has a plurality of transparent patterns representing the strings and frets on the fingerboard of an instrument. The base has a plurality of spot patterns representing different types of chords. The device will show a plurality of musical chords, differing in position on the fingerboard, in musical key and in chord type. Other related chord types to the chosen chord type are also shown, as are the ordinary chords that relate to a particular key.

WIPO Patent No. 8,401,845 to Duffy discloses a slide rule having a base having indicia that simulate an instrument fingerboard, a first slidable overlay showing finger positions for a scale and a second slidable overlay showing chord fingering positions. Thus, a musician can see the finger positions of a certain scale or chord and separately see the chromatic notes of these fingering positions, the chromatic notes being shown separately from the simulated fingerboard. Both overlays may be used simultaneously to see acceptable combinations.

While each of the typical prior art devices discussed above serves to aid the student of music, most relate to predicting chords alone rather than relating them to any scale. Those prior art devices which do address chords to a scale, fail to be applicable to the chords of a scale and chords of its relative scales.

Accordingly, what is needed is a chord progression finder that can show the composer what notes are in harmony for any selected scale in any selected tonic or key note, show the various chord types of both the key scale and its relative scales, and show the student the note fingering positions therefor for any instrument he or she is learning.

SUMMARY OF THE INVENTION

The present invention is a chord progression finder which permits students of music and composers of music to readily determine each and every tone of a selected musical scale in a selected key note and each and every tone of its relative musical scales, as well as the various chords playable for the selected musical scale and its relative scales, while simultaneously providing information on which keys or frets of a musical instrument are to be played in order to produce each of the indicated tones.

The present invention is composed of three basic parts: A base, a first overlay and a second overlay, where the overlays interconnect with the base so to permit each overlay to separately slide relative to the base. The base and the first overlay cooperate to indicate notes for playing scales on an instrument for a key note in a selected scale and its relative, scale while the base, the first overlay and the second overlay cooperate to indicate notes for playing chord types for a key note in a selected scale and its relative scales.

A base is provided having thereon printed information pertaining to a particular musical instrument and which, in addition, has printed thereon fingering patterns for playing tones on that instrument arranged in a predetermined sequence indicative of any number of desired musical scales. A slidable, clear first overlay is slidably connected with the base. The first overlay has printed thereon the letter designations for the musical tones arranged in a predetermined sequence so as to cooperate with the fingering patterns indicated on the base in order to selectively indicate to the user the finger positions on the subject musical instrument that will produce the tones of a selected musical scale and its relative scales. A slidable, clear second overlay is also slidably connected with the base. The second overlay has printed thereon indicia indicative of chord numbers arranged in a predetermined sequence. The base and the first overlay cooperate with the second overlay to indicate to the user the finger positions on the subject musical instrument that will produce the specific chord voicings of the selected scale and its relative scales. These chords can then be used to form chord progressions, as the musician may thereupon select.

Although some musical instruments are only able to play single notes in a musical scale, the chord progression finder according to the present invention is still needed because of the knowledge the device imparts. The chord progression finder will show the specific chord types and the tones within those chord types that will help the musician to harmonize his/her instrument to other musical instruments which can play chords and chord progressions.

Accordingly, it is an object of the present invention to provide a chord progression finder that will provide the user with information of what tones are associated with a selected musical scale and its relative scales, and any chord types associated with the selected scale and its relative scales.

It is another object of the present invention to provide a chord progression finder that will provide the user with information on: (1) what tones are associated with a musical scale, (2) the tones of what chord types are associated with the musical scale, and (3) which finger board positions of a particular musical instrument that will play those tones.

It is a further object of the present invention to provide a chord progression finder that will provide the user with information on: (1) what tones are associated with a selected musical scale and its relative scales, (2) the tones of what chord types are associated with the selected musical scale and its relative scales, and (3) which finger board positions of a particular musical instrument that will play those tones.

These, and additional objects, advantages, features and benefits of the invention will become apparent from the following specification.

BRIEF DESCRIPTION OF THE DRAWINGS

In FIG. 2A the first overlay is positioned to indicate the tones and the instrument fingering positions for a first pre-selected tonic or key note in a first pre-selected scale, and the second overlay is positioned to indicate the chord types playable in the selected key note. In FIG. 2B the first overlay is positioned as in FIG. 2A, but the second overlay is now positioned to indicate the chord types playable in another selected key note.

In FIG. 3A the first overlay is positioned to indicate the tones and the instrument fingering positions for a second pre-selected tonic or key note in a second pre-selected scale, and the second overlay is positioned to indicate the chord types playable in the selected key note. In FIG. 3B the first overlay is positioned as in FIG. 3A, but the second overlay is now positioned to indicate the chord types playable in another selected key note.

FIGS. 5A and 5B are plan views of the second preferred embodiment of the present invention for indicating the tones of chords and finger positions therefor for a percussion instrument, namely the piano, FIG. 5B being fragmentary. In FIG. 5A the first overlay is positioned to indicate the tones and the instrument fingering positions for a first pre-selected tonic or key note in a first pre-selected scale, and the second overlay is positioned to indicate the chord types playable in the selected key note. In FIG. 5B the first overlay is positioned as in FIG. 5A, but the second overlay is now positioned to indicate the chord types playable in another selected key note.

DETAILED DESCRIPTION OF THE PREFERRED EMBODIMENTS

Presently, when someone is learning to play a musical instrument, he or she must first learn the musical scales, then learn the fingering positions on the particular instrument being learned, then learn the chord types and the fingering positions for these, too. Confusion is caused in the mind of the student because each of these are learned separately and the student is required to put them together on his or her own. The present invention is of particular usefulness to students of music because it permits the student to see simultaneously both the notes to be played in any selected musical scale and its relative scales, the notes of the chord types playable for each of these scales, and the fingering position that is required for playing those notes on the musical instrument being learned. Thus, the present invention is of major significance, in that it provides the necessary integration of learning the scales, chord types and the instrument, while saving an enormous amount of time.

The following description of the present invention incorporates the Musical Scale Indicator of Robert A. Bezeau, Jr. as described in the above cited parent patent application Ser. No. 07/273,237, and which is hereby incorporated hereinto by reference.

Figure 1A:
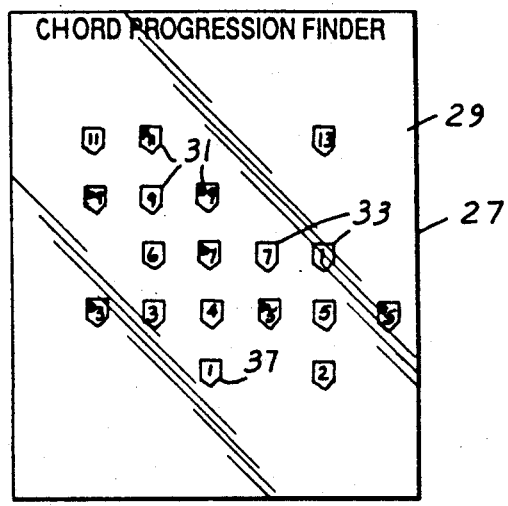
FIG. 1A is a plan view of the second overlay according to the first preferred embodiment of the present invention, having printed thereon chord indicia in a pre-determined pattern.
Figure 1B:
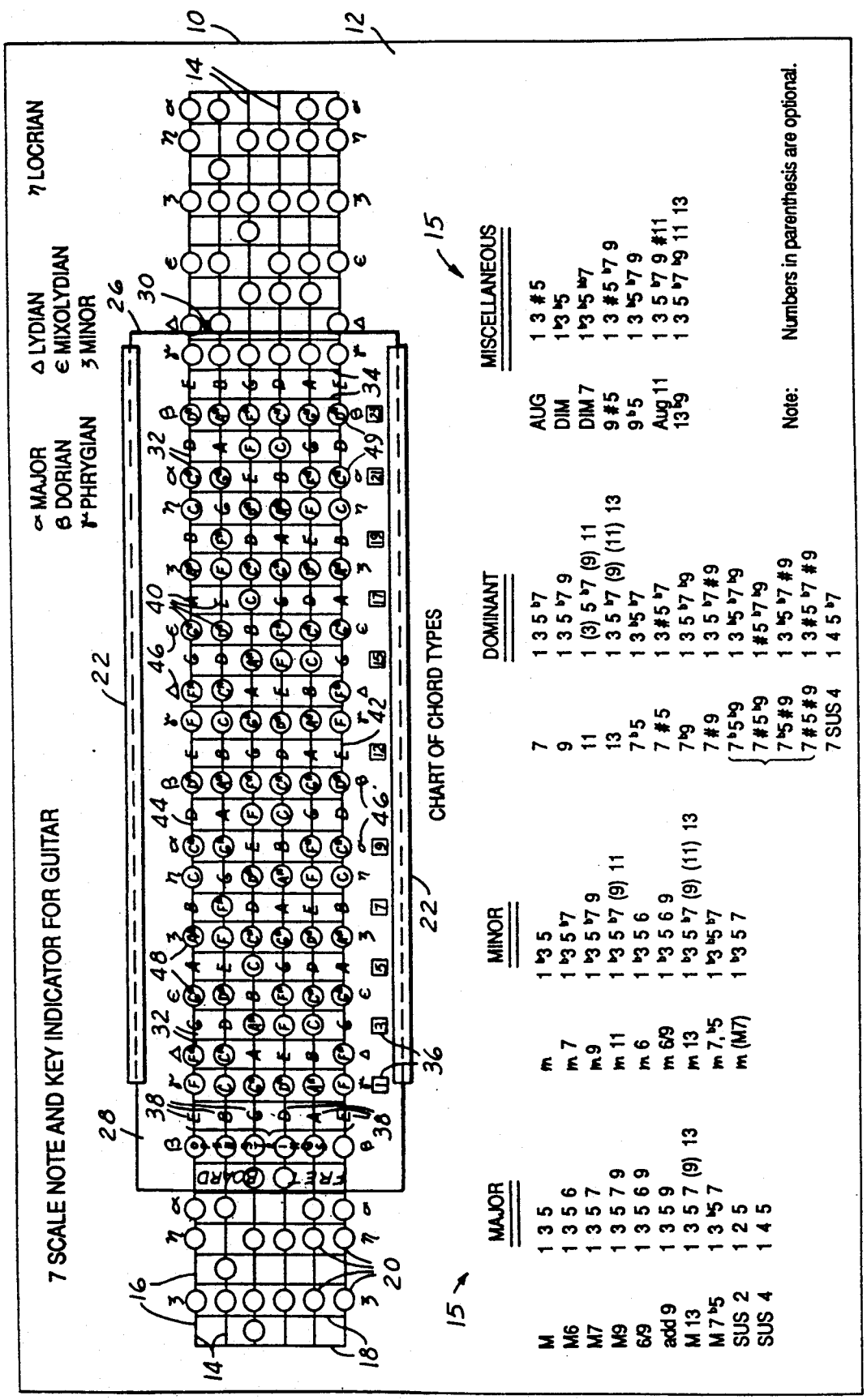
FIG. 1B is a plan view of a Musical Scale Indicator described in the above identified U.S. patent application to R. Bezeau, which includes a base according to a first preferred embodiment of the present invention in which is indicated fingering positions on the strings for a fret board of a stringed instrument, namely the guitar, and a first overlay according to the first preferred embodiment of the present invention having printed thereon a simulated fret board for a guitar.

Referring now to the figures, FIG. 1B shows a first embodiment of the invention for use with stringed instruments, in particular the guitar.

Figure 4:
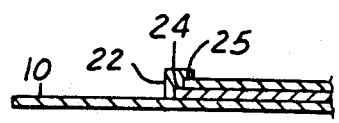
FIG. 4 is a detail part fragmentary end view along lines 4—4 in FIG. 3B, showing the interconnection of the first and second overlays with the base.

A base 10 has information and indicia printed on the surface 12 thereof. A chart of chord types 15 is provided, arranged according to chord families. The six strings of the guitar are represented by six horizontally oriented string lines 14. The six string lines 14 in combination represent the strings that would be found on the fret board of a guitar. The string lines 14 are divided into a plurality of vertical columns 16 by a number of vertically oriented lines 18. Each of the vertical columns represents a finger contact region on the string lines 14. Located on the string lines 14 are a plurality of fret board fingering pattern indicia 20. The fingering pattern indicia are selectively located on the string lines 14 in a manner to be described hereinbelow. The base 10 is preferred to be constructed of a stiff cardboard type of material, but could be made from any material which can provide a flat surface, such as plastic. Located in parallel relationship with the string lines 14 and equally spaced therefrom, is a pair of lips 22, preferably constructed of plastic, which are firmly attached to the base 10. The lips provide mutually facing first overhangs 24 and second overhangs 25, as shown in FIG. 4, each overhang being spaced from the surface 12 of the base 10 to allow for insertion of a respective overlay, as will be detailed hereinbelow.

FIG. 1B also shows a first overlay 26 which is structured to fit under the overhangs 24 of the lips 22 and be slidable therealong. The overlay 26 is preferred to be made of a flexible, clear plastic sheet, and has indicia imprinted on its surface 28 which is indicative of a simulated fret board 30 of a guitar. The simulated fret board 30 has twenty-four frets 32 which are demarcated by a number of vertical lines 34, which represent fret bars on the fret board. The width of the frets 32 is the same as the width of the columns 16 on the base. Every other fret has a fret number indicator 36 next to it so that the user may easily identify each of the frets 32. Immediately adjacent the first fret is a vertical listing of open string tone letters 38, each of which representing the open string tone letter of each of the string lines 14 of the base. The open string tone letters 38 are spaced so as to coincide with the string lines 14 when the overlay 26 is positioned above the base 10 and slid along the lips 22. The overlay 26 additionally has a series of tone letters 40 which follow each respective open string tone letter 38 along its respective string line 14 of the base 10. Each of the tone letters 40 follow its respective open string tone letter in the sequence of the chromatic scale.

As can be seen from FIG. 1B, the overlay 26 is positioned above the surface 12 of the base 10 so that it is slidably guided and held adjacent the base by interference with the lips 22. In this mounting configuration of the overlay on the base, the tone letters 40 horizontally coincide with respective string lines 14. The overlay 26 is slidable in either horizontal direction along the lips 22 so that the frets 32 and the tone letters 40 may be made to selectively coincide with columns 16 on the base 10.

The primary object of movement of the first overlay 26 relative to the base 10 is to show a user what tones or notes are playable for a selected key note in a selected scale on a particular musical instrument, as well as the tones or notes playable for the relative scales of the selected scale. This object is accomplished by the hereinabove described cooperative engagement of the base 10 and the overlay 26, in conjunction with the series of fingering pattern indicia 20 located on the surface of the base in the columns 16 on the string lines 14 that are selected to show the fingering position of playing the chromatic scale notes selected for any musical scale in any key. It is preferred that the fingering indicia be in the form of circles, but any other clearly visible marking is acceptable.

The method for attaining the aforesaid fingering positions from the chromatic scale of any musical scale in any key is based upon: (1) the string line and column indicia on the surface of the base, which shows through the overlay; (2) the fret and tone letter indicia on the surface of the overlay which cooperates with the indicia on the surface of the base; and (3) the fingering pattern indicia on the surface of the base which shows the tone letters from the chromatic scale as played vertically across the string lines for a selected musical scale.

The theory behind the placement of the fingering pattern indicia 20 on the surface 12 of the base 10 is as follows. FIG. 1B shows the fingering pattern indicia for playing musical scales vertically across the strings of a guitar for several scales, namely Major, Dorian, Phrygian, Lydian, Mixolydian, Minor and Locrian. The fingering pattern indicia 20 for these scales are sequentially displayed on the surface of the base in an at least partially superimposed order of Locrian, Major, Dorian, Phrygian, Lydian, Mixolydian, Minor etc. At least partial superposition of the scales is possible due to the similarity of patterns in some of the fingering pattern indicia locations. Above, or alternatively within, one of the fingering pattern indicia located at the uppermost string line 44 is a lead note indicia 46 which indicates the lead (or key) note fingering pattern position 48 for the particular scale. The lead note fingering pattern position 48 is designated by a unique lead note indicia 46 for each scale. In the figures, the different key note fingering positions are identified by respective lead note indicia 46 given as Greek alphabet symbols, as follows: Major, alpha; Dorian, beta; Phrygian, gamma; Lydian, delta; Mixolydian, epsilon; Minor, zeta; and Locrian, eta. Of course, other lead note indicia are possible besides the Greek letters, such as a color coding scheme which could be located within the circle indicia of the lead note fingering pattern position for each musical scale.

FIG. 1A shows the second overlay 27 which is structured to fit into the overhangs 25 of the lips 22, and slide therealong independently of the first overlay 26. The second overlay 27 is preferred to be made of a flexible, clear plastic sheet, and has chord indicia 31 imprinted on its surface 29 which is indicative of the various notes of the chord types of the chord families 15. Each of the chord indicia 31 include chord numbers 33 which are derived from the conventional chord numbering system of chord designations, as described hereinabove in the Background of the Invention. While the form of the chord indicia 31 shown in FIG. 1A is that of boxes, other forms are contemplated, such as rings, where the rings may be color coded so as to be uniquely indicative of each of the chord numbers 33.

With the second overlay 27 slidably mounted to the lips 22 as described above, the second overlay may be slid relative to the first overlay 26 and the base 10 so that the chord indicia 31 may be selectively aligned with the frets 32, tone letters 40 and columns 16.

The primary object of movement of the second overlay 27 relative to the first overlay 26 and the base 10 is to show a user what tones (or notes) of what chord types are playable for a selected key note in a selected scale on a particular musical instrument, as well as the tones (or notes) of chord types playable for the relative scales of the selected scale. This object is accomplished by the hereinabove described cooperative engagement of the base 10, the first overlay 26, and the second overlay 27.

The method for attaining the aforesaid chord type fingering positions from the chromatic scale of any musical scale in any key, and the relative musical scales thereto, is based upon: (1) the string line and column indicia on the surface of the base, which shows through both the first and second overlays; (2) the fret and tone letter indicia on the surface of the first overlay which shows through the second overlay and which cooperates with the indicia on the surface of the base; (3) the fingering pattern indicia on the surface of the base which shows through both the first and second overlays and which shows the tone letters from the chromatic scale as played vertically across the string lines for a selected musical scale; and (4) the chord indicia on the surface of the second overlay which cooperates with the fret and tone letter indicia on the first overlay, the string and line column indicia on the base and the fingering pattern indicia on the base.

The theory behind the placement of the chord indicia 31 on the surface 29 of the second overlay 27 is as follows. FIG. 1A shows the chord indicia 31 for playing chord types of the chord families, namely the Major, Minor and Dominant chord families. These chord indicia are sequentially displayed vertically and from left to right on the surface 29 using the conventional chord numbering system referred to above in the Background of the Invention, preferably modified, as follows (and as used in FIG. 1A): C,1; D, 2; D#, ♭3; E, 3; F, 4; F#, ♭5; G, 5; G#, #5; A, 6; A#, ♭7; B, 7; C, 1; C#, ♭9; D, 9; D#, #9; F, 11; F#, #11; A, 13. There are thus preferred to be 17 different chord indicia 31, each representing a specific chord number 33 from the conventional chord numbering system referred to above. The selection of the chord indicia 31 is based upon the most widely used grouping of chords. Seventeen such chord indicia 31 are shown in FIG. 1A, so as to enable a user to choose any location on the fingerboard for selecting a chord type and also to allow for all of the inversions of each chord type because of their many different locations. The alternative, to have more than 17 chord indicia on a much larger second overlay 27 is possible, but not desirable.

Referring now to both FIGS. 1A and 1B, below the lowermost string line 42 is located the lead note indicia (this is precisely the same lead note indicia 46 appearing just above the uppermost line, but is here designated as 46' for purposes of clarity), which indicates the lead (or key) note fingering pattern position 49 to be used in connection with the chord indicia 31 of second overlay 27. In order to be able to reference the chord indicia 31 with a selected lead note fingering pattern position 49, a root chord indicia 37 is designated, which corresponds to the chord number 1, and the method of performing this shall be described immediately below.

Operation of the present invention according to the first embodiment will now be described with particular reference to FIGS. 2A, 2B, 3A and 3B.

Figure 2A:
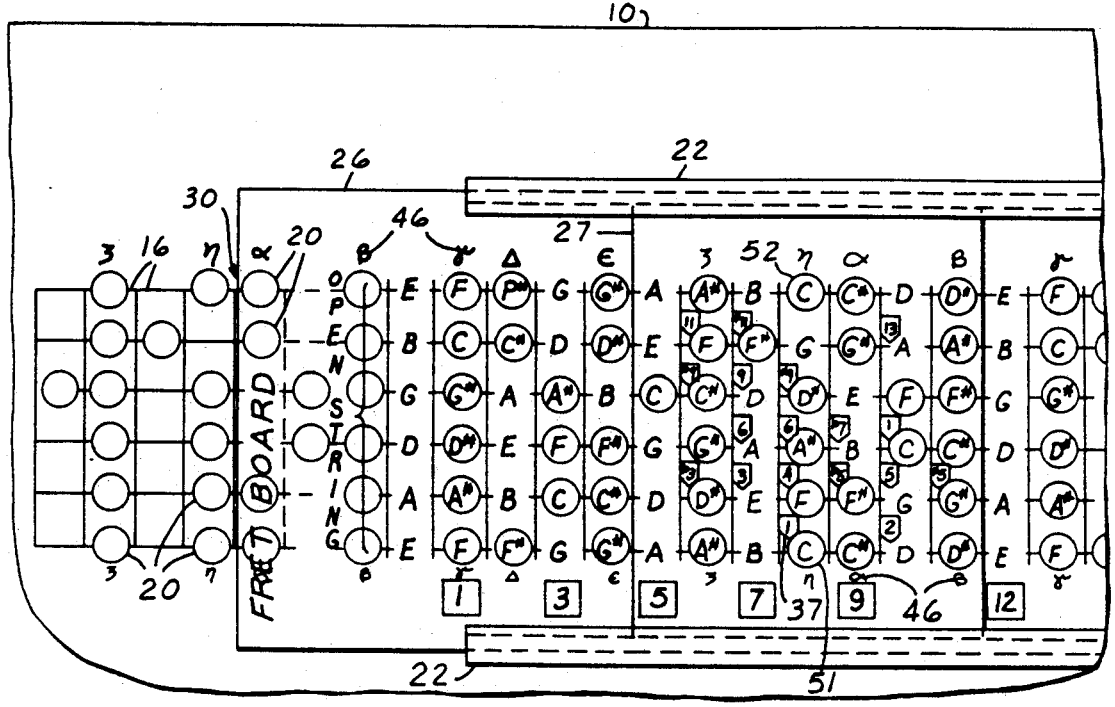
FIGS. 2A and 2B are fragmentary plan views of the first preferred embodiment of the present invention for indicating the tones of chords and finger positions therefor for a stringed instrument, namely the guitar, showing first and second examples of operation.

FIG. 2A shows a first example of operation. Let us say that a user wants to determine the chord types and the notes playable for "C Locrian".

Firstly, the user slides the first overlay 26 relative to the base 10 so that the tone letter "C" on the overlay is aligned so as to be located directly over the lead note fingering pattern position 52 for the Locrian scale as indicated by the lead note indicia 46 for the Locrian scale, eta, on the base 10. With the overlay in this alignment relative to the base, the user will see at a glance each and every note playable on the simulated fret board 30. The playable notes in "C Locrian" are indicated by each and every tone letter 40 which lies above a fingering pattern indicia 20. Of course, when the user selects "C Locrian", as described above, the user will have simultaneously selected the relative musical scales in other lead note fingering positions. That is, the "C Locrian" selection also selects "F Phrygian", "F-Sharp Lydian", "G-Sharp Mixolydian", "A-Sharp Minor", "C-Sharp Major", and "D-Sharp Dorian".

Secondly, the user slides the second overlay 27 relative to the base 10 and the first overlay 26 so that the root chord indicia 37 aligns with the lead note fingering pattern position 51 of lead note indicia 46' for the Locrian scale, eta.

Now, some tone letters 40 of the first overlay will be aligned over fingering pattern indicia 20 of the base, and some chord indicia 31 will be aligned with those tone letters which have also aligned with the fingering pattern indicia. Accordingly, those tones which are aligned with both the fingering pattern indicia and the chord indicia are tones which are playable for chord types. Those tones which are not aligned with both the fingering pattern indicia and the chord indicia are not playable. The fingering pattern indicia 20 indicate where on the instrument the tones are played. Reference may now be had to the Chart of Chord Types 15, in order to see what chord numbers may be combined to construct chord voicings for the scale chosen ("C Locrian" in this case).

Figure 2B:
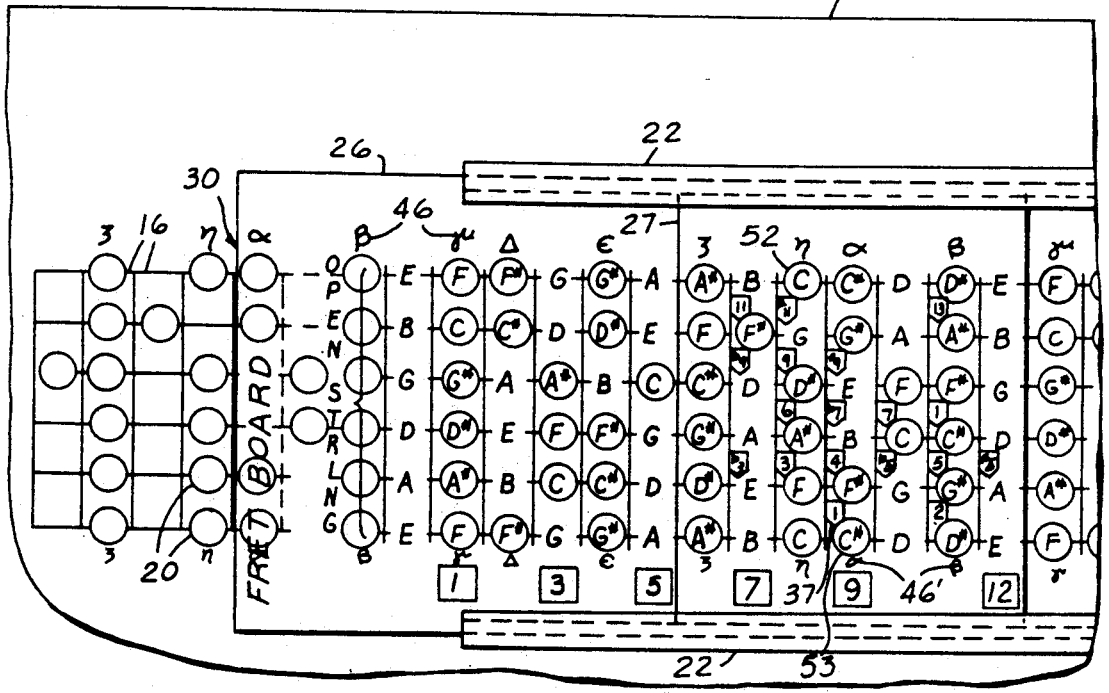

FIG. 2B shows a second example of operation, where the first overlay 26 remains positioned for "C Locrian", as indicated in FIG. 2A, but the second overlay 27 is now slid to indicate the chord types for the relative scale "C-Sharp Major" ("C-Sharp Major" being a relative scale of "C Locrian".) This is accomplished by aligning the root chord indicia 37 with the lead note fingering pattern position 53 of lead note indicia 46' for the Major scale, alpha. Again, those tones which are aligned with both the fingering pattern indicia and the chord indicia are tones which are playable for chord types. Those tones which are not aligned with both the fingering pattern indicia and the chord indicia are not playable. The fingering pattern indicia 20 indicate where on the instrument the tones are played. And again, reference may now be had to the Chart of Chord Types 15, in order to see what chord numbers may be combined to construct chord voicings for the scale chosen ("C-Sharp Major" in this case). It should be noted that the second overlay can be used to find chord types for each of the other remaining relative scales of C Locrian by simply moving the second overlay so as to align the root chord indicia with other lead note indicia 46'.

Figure 3A:
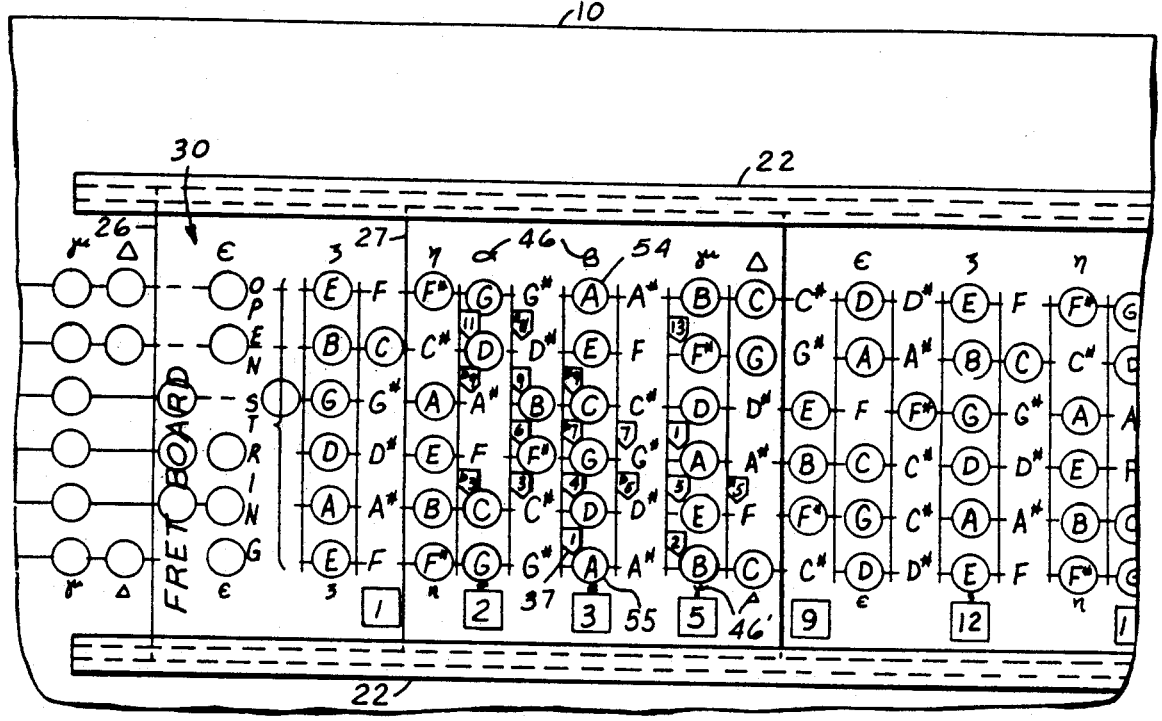
FIGS. 3A and 3B are fragmentary plan views of the first preferred embodiment of the present invention for indicating the tones of chords and finger positions therefor, showing third and fourth examples of operation.

FIG. 3A shows a third example of operation. Now, let us say the user wants to determine the chord types and the notes playable for "A Dorian".

Firstly, the user slides the first overlay 26 relative to the base so that the tone letter "A" on the overlay is aligned so that it is located directly over the lead note fingering position 54 for the Dorian Scale as indicated by the lead note indicia 46 for the Dorian scale, beta, on the base 10. Again, with the overlay in this alignment relative to the base, every playable note on the simulated fret board 30 will be displayed for "A Dorian", the playable notes being those tone letters 40 on the overlay which are directly above a fingering pattern indicia 20 on the base. Further, the relative scales of "A Dorian" have also been simultaneously selected, specifically, "E Minor", "F-sharp Locrian", "G Major", "B Phrygian", "C Lydian", and "D Mixolydian".

Secondly, the user slides the second overlay 27 relative to the base 10 and the first overlay 26 so that the root chord indicia 37 aligns with the lead note fingering pattern position 55 of the lead note indicia 46' for the Dorian scale, beta.

Now, some tone letters 40 of the first overlay will be aligned over fingering pattern indicia 20 of the base, and some chord indicia 31 will be aligned with those tone letters which have also aligned with the fingering pattern indicia. Accordingly, those tones which are aligned with both the fingering pattern indicia and the chord indicia are tones which are playable for chord types. Those tones which are not aligned with both the fingering pattern indicia and the chord indicia are not playable. The fingering pattern indicia 20 indicate where on the instrument the tones are played. Reference may now be had to the Chart of Chord Types 15, in order to see what chord numbers may be combined to construct chord voicings for the scale chosen ("A Dorian" in this case).

Figure 3B:
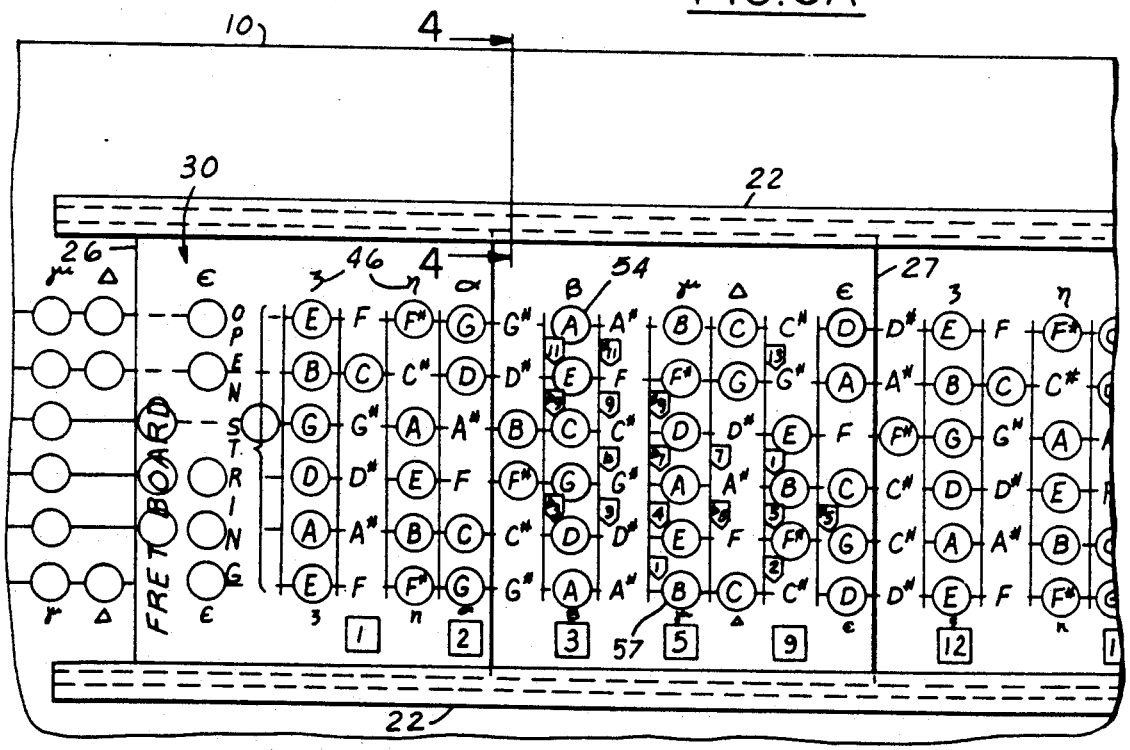

FIG. 3B shows a fourth example of operation, where the first overlay 26 remains positioned for "A Dorian", as indicated in FIG. 3A, but the second overlay 27 is now slid to indicate the chord types for the relative scale "B Phrygian" ("B Phrygian" being a relative scale of "A Dorian".) This is accomplished by aligning the root chord indicia 37 with the fingering pattern position 57 of the lead note indicia 46' for the Phrygian Scale, gamma. Again, those tones which are aligned with both the fingering pattern indicia and the chord indicia are tones which are playable for chord types. Those tones which are not aligned with both the fingering pattern indicia and the chord indicia are not playable. The fingering pattern indicia 20 indicate where on the instrument the tones are played. And again, reference may now be had to the Chart of Chord Types 15, in order to see what chord numbers may be combined to construct chord voicings for the scale chosen ("B Phrygian" in this case).

From the foregoing examples of operation, it is clear to those skilled in the art that the present invention is adaptable for any chord type in any selected scale and its relative scales by simply selecting a selected scale via the first overlay which simultaneously selects its relative scales, then selecting from any of these scales chord notes for these scales via the second overlay.

Figure 5B:
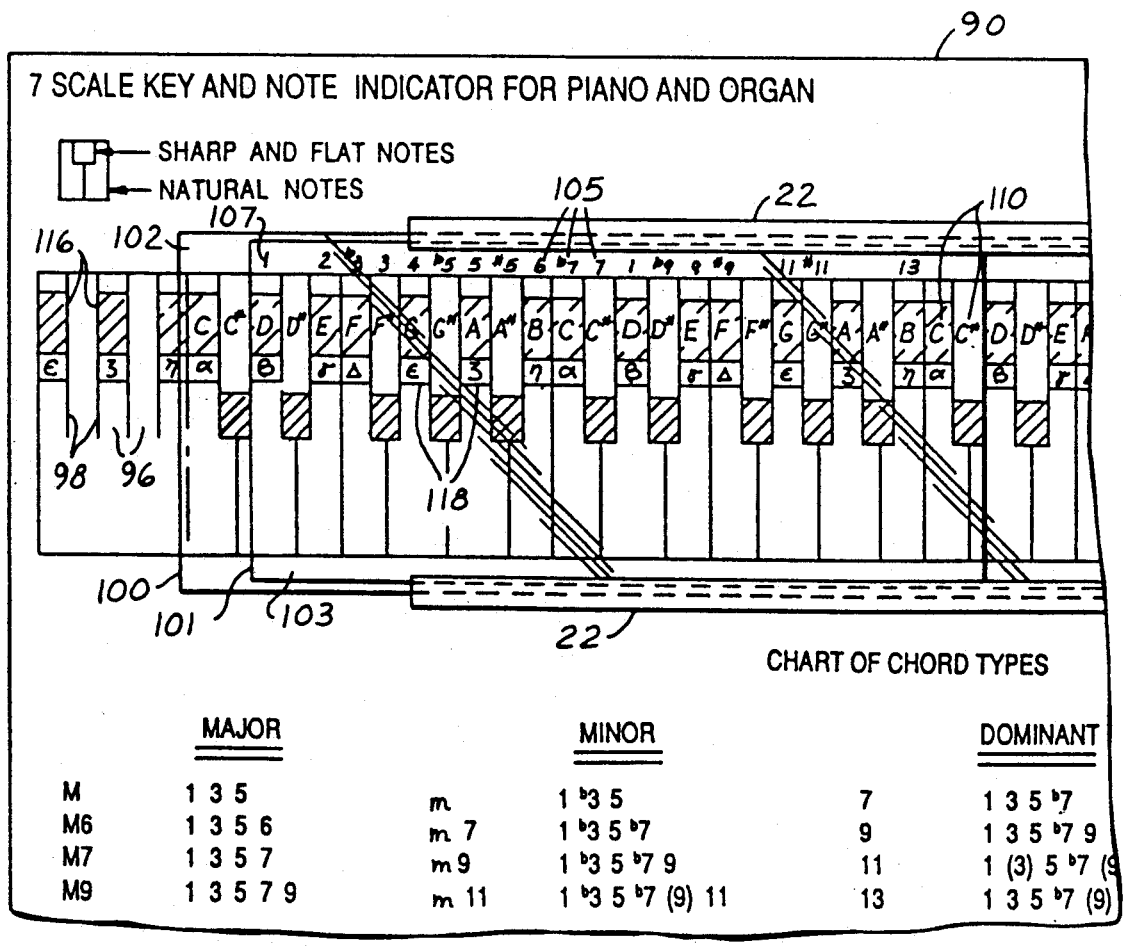
Figure 6:
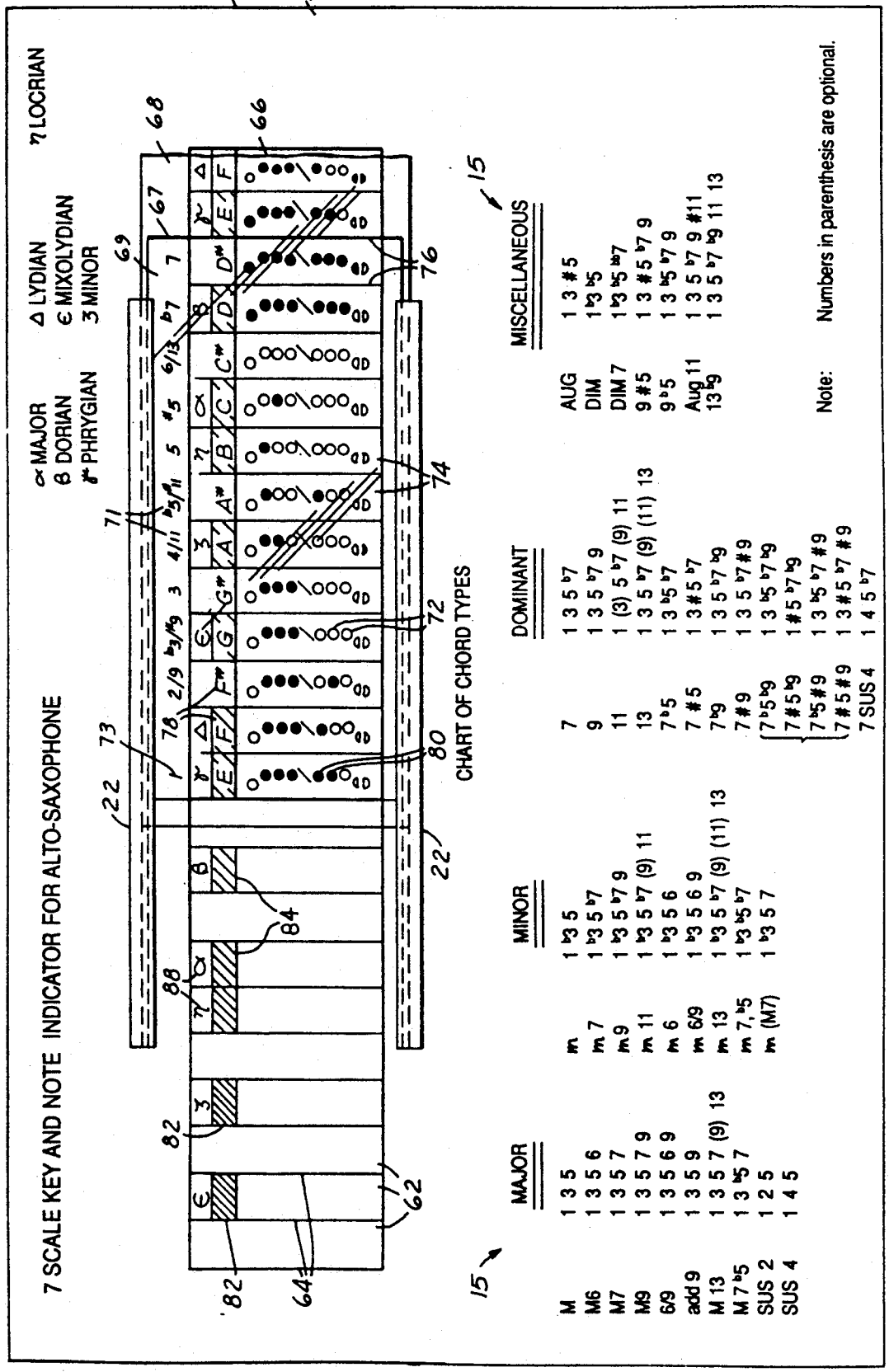
FIG. 6 is a plan view of a third preferred embodiment of the present invention for indicating the letter tones of chords playable with respect to a brass or woodwind instrument, namely the alto-saxophone.

While the above preferred embodiment of the present invention is applied to the fret board of a guitar, it should be clear to those skilled in the art that the present invention can be readily and easily adapted for use with the other families of musical instruments. FIGS. 5A, 5B and 6 are examples of alternative embodiments, showing how the present invention may be adapted to a percussion instrument (the piano) and a wind instrument (the alto-saxophone). Again, it should be noted that although some instruments, such as the alto-saxophone, cannot play chords, the present invention is still needed in order to show what chords may be played by other instruments so as to harmonize with the scale notes playable on that instrument.

FIGS. 5A and 5B show a second embodiment of the present invention adapted for use with a percussion instrument, namely the piano.

The base 90 is similar in construction to that of the base 10 for the guitar, in that it has a flat surface 92 and a pair of mutually parallel, spaced apart lips 22 structured as shown in FIG. 4. Imprinted on the surface 92 of the base 90 is a series of columns 96 which are demarcated by a number of vertical lines 98. At an upper portion 114 of each column 96 on the base 90, is a fingering pattern indicia 116, shown in the figures by cross-hatching, indicating whether that column is a column representing a fingering position to produce scale notes. Below each fingering pattern indicia 116 is a lead note indicia 118 using the Greek alphabet which designates that fingering pattern position to be a particular lead note fingering pattern position, in the manner hereinabove described for the guitar embodiment. The base 90 also has imprinted thereon a chart of chord types 15, arranged according to chord families.

A clear first overlay 100 is structured like that of the first overlay 26 for the guitar, but has imprinted on its surface 102 a substantial portion of a simulated piano finger board 104. The first overlay 100 inserts into the first overhangs 24 and is slidable along the base. Each key 106 thereof, inclusive of white keys 106a and black keys 106b, has a width which is equal to the width of the columns 96 on the base surface 92. An upper portion 108 of each key 106 has a tone letter 110 imprinted which represents the note that is produced by that key. The sequence of the tone letters is based upon the chromatic scale and progresses from right to left starting with C. In order to facilitate the aforesaid tone letter marking and to afford a view of the fingering pattern indicia 116 and lead note indicia 118 on the underlying base 90, a portion 112 of the black keys is left clear.

A clear second overlay 101 is structured like that of the second overlay 27 for the guitar, but has imprinted on its surface 103 chord indicia 105. The second overlay 101 inserts into the second overhangs 25 and is slidable along the base and the first overlay 100. In FIG. 5A the chord indicia 105 is in the form of numbers pertaining to the conventional chord numbering system hereinabove described. One of the chord indicia 105 is a root chord indicia 107, which is the chord indicia corresponding to the numeral 1. Of course, other indicia having a known relation to these numbers may be substituted, as desired. It is desired to locate the chord indicia 105 above the fingering pattern indicia 116, so that information printed on the base 90 and the first overlay 100 can show through the second overlay 101 and the chord indicia 105 will not interfere therewith.

FIG. 5A is indicative of a first example of operation of the second embodiment of the present invention, in which a user wishes to determine the chord types and the notes playable for "C Major".

Firstly, the user slides the first overlay 100 until the tone letter C is aligned with the lead note fingering pattern indicia 116 that is designated by lead note indicia 118, alpha (which signifies the Major Scale). Each of the tone letters playable in that scale, and the piano keys for each of those notes represented by the tone letters, as are those for all relative scales, are indicated wherever a tone letter 110 on the overlay 100 coincides with a fingering pattern indicia 116 on the base 90.

Secondly, the user slides the second overlay so that the root chord indicia 107 is aligned with the lead note fingering pattern indicia 116 that is indicated by lead note indicia 118, alpha (which signifies the Major scale).

Now, some tone letters 110 of the first overlay 100 will be aligned over fingering pattern indicia 116 of the base 90, and some chord indicia 105 will be aligned with those tone letters which have also aligned with the fingering pattern indicia. Accordingly, those tones which are aligned with both the fingering pattern indicia and the chord indicia are tones which are playable for chord types. Those tones which are not aligned with both the fingering pattern indicia and the chord indicia are not playable. The fingering pattern indicia 116 indicate where on the instrument the tones are played. Reference may now be had to the Chart of Chord Types 15, in order to see what chord numbers may be combined to construct chord voicings for the scale chosen ("C Major" in this case).

FIG. 5B shows a second example of operation of the second embodiment of the present invention, where the first overlay 100 remains positioned for "C Major", as indicated in FIG. 5A, but the second overlay 101 is now slid to indicate the chord types for the relative scale "D Dorian" ("D Dorian" being a relative scale of "C Major".) This is accomplished by aligning the root chord indicia 107 with the fingering pattern indicia 116 that is indicated by lead note indicia 118, beta (which signifies the Dorian scale). Again, those tones which are aligned with both the fingering pattern indicia and the chord indicia are tones which are playable for chord types. Those tones which are not aligned with both the fingering pattern indicia and the chord indicia are not playable. The fingering pattern indicia 116 indicate where on the instrument the tones are played. And again, reference may now be had to the Chart of Chord Types 15, in order to see what chord numbers may be combined to construct chord voicings for the scale chosen ("D Dorian" in this case).

FIG. 6 shows a third embodiment of the present invention adapted for use in the class of brass and woodwind instruments, namely for the alto-saxophone.

The base 56 for the alto-saxophone is constructed like that of the base 10 for the guitar, in that it has a flat surface 58 and a pair of mutually parallel, spaced apart lips 22 structured as shown in FIG. 4. Imprinted on the surface 58 of the base 56 is a series of columns 62 which are demarcated by a number of vertical lines 64. The surface 58 of the base 56 has, at an upper portion 82 of each column 62, a fingering pattern indicia 84, shown in the figures by a cross-hatching, indicating whether that column is a column representing a fingering position to produce scale notes. Above each fingering pattern indicia 84 is a lead note indicia 88, using the Greek alphabet, which designates that fingering pattern position to be a particular lead note fingering pattern position, in the manner hereinabove described for the guitar embodiment. The base 56 also has imprinted thereon a chart of chord types 15, arranged according to chord families.

A clear first overlay 66 is structured like that of the first overlay 26 for the guitar, but has imprinted on its surface 68 a repetitive number of a simulated finger boards 70 for the alto-saxophone. The first overlay 66 inserts into the first overhangs 24 and is slidable along the base 56. The simulated finger boards 70 are provided by eight circles 72, each representing a fingering key on the alto-saxophone. The first overlay surface 68 has a number of columns 74 demarcated by a number of vertical lines 76. In each column 74 is one of the simulated finger boards 70. Each column 74 on the overlay surface 68 has the same width as each column 62 on the base surface 58. Within each column 74, above its respective simulated finger board 70 is located a tone letter 78 from the chromatic scale. The tone letters 78 are in chromatic scale sequence from left to right, starting on E. In order to produce the indicated note of the letter tone in each column, the respective simulated key board in that column has the required keys which must be played indicated by solid circles 80.

A clear second overlay 67 is structured like that of the second overlay 27 for the guitar, but has imprinted on its surface 69 chord indicia 71. The second overlay 67 inserts into the second overhangs 25 and is slidable along the base and the first overlay 66. In FIG. 6 the chord indicia 71 is in the form of numbers pertaining to the chord numbering system hereinabove described. One of the chord indicia 71 is a root chord indicia 73, which is the chord indicia corresponding to the numeral 1. Of course, other indicia having a known relation to these numbers may be substituted, as desired. It is desired to locate the chord indicia 71 above the lead note indicia 88, so that information printed on the base 56 and the first overlay 66 can show through the second overlay 67 and the chord indicia 71 will not interfere therewith.

FIG. 6 is indicative of an example of operation of the third embodiment of the present invention, in which a user wishes to determine the chord types and the notes playable for "E Phrygian", where the selected scale is "C Major".

Firstly, the user slides the overlay 66 until the tone letter C is aligned with lead note fingering pattern indicia 84 that is designated by lead note indicia 88, alpha (which signifies the Major scale). Each of the tone letters which are playable in that scale and each of its relative scales are then indicated where the tone letter 78 on the overlay 66 coincides with a fingering pattern indicia 84 on the base 56. Further, the keys to be played on the alto-saxophone are indicated by the solid circles 80 of the finger boards 70 within the columns having playable tone letters.

Secondly, the user slides the second overlay 67 so that the root chord indicia 73 is aligned with the lead note fingering pattern indicia 84 that is designated by the lead note indicia 88, gamma (which signifies the Phrygian scale).

Now, some tone letters 78 of the first overlay 66 will be aligned over fingering pattern indicia 84 of the base 56, and some chord indicia 71 will be aligned with those tone letters which have also aligned with the fingering pattern indicia. Accordingly, those tones which are aligned with both the fingering pattern indicia and the chord indicia are tones which are playable for chord types. Of course, it will be some other musical instrument playing these chords. Those tones which are not aligned with both the fingering pattern indicia and the chord indicia are not playable. The fingering pattern indicia 84 indicate where on the instrument the tones are played. Reference may now be had to the Chart of Chord Types 15, in order to see what chord numbers may be combined to construct chord voicings for the scale chosen ("E Phrygian" in this case).

Based upon the foregoing detailed description of particular embodiments of the present invention, it is clear to those skilled in the art that the present invention, which takes a simulated finger board for a musical instrument and selectively combines this with both musical scale fingering patterns and chord fingering patterns (letter notes in the case of musical instruments which cannot play chords), where the fingering patterns are each derived from the chromatic scale, may be readily adapted to any musical instrument, any musical scale, and any chord voicing.

To those skilled in the art to which this invention appertains, the above described preferred embodiments may be subject to change or modification. Such change or modifications can be carried out without departing from the scope of the invention, which is intended to be limited only by the scope of the appended claims.

What is claimed is:

1. A chord progression finder, comprising:

a base having a first flat surface, said first flat surface having a first indicia placed thereon indicating fingering patterns for playing at least three pre-selected music scales in selected tonics on a pre-selected musical instrument, said first indicia comprising fingering indicia for indicating fingering patterns for playing said pre-selected music scales on said pre-selected musical instrument and lead note indicia for indicating a lead note location of each fingering pattern of said fingering patterns for each said pre-selected music scale of said pre-selected music scales;

a first overlay having a second flat surface positioned in parallel relation with said first flat surface of said base, said first overlay being constructed of a material which permits seeing through said first overlay so that said second flat surface of said first overlay and said first flat surface of said base may be simultaneously seen, said second flat surface of said first overlay having a second indicia placed thereon indicating a simulated finger board of said pre-selected musical instrument, said simulated finger board indicating fingering positions for said pre-selected musical instrument, said second indicia further indicating a chromatic scale tone letter for each fingering position of said fingering positions for said pre-selected musical instrument, the chromatic scale tone letters being arranged in chromatic scale sequence, said first overlay being slidably moved relative to said base so as to selectively indicate fingering positions for playing a selected music scale in a selected tonic on said simulated finger board of said pre-selected musical instrument, said selected tonic for said selected music scale being selected by sliding said first overlay relative to said base until a selected chromatic scale tone letter that defines said selected tonic on said first overlay aligns with a selected lead note indicia that indicates the selected music scale on said base, selection of said selected tonic for the selected music scale also simultaneously selecting a particular tonic respectively for each other music scale of said pre-selected music scales, a tonic being selected wherever a chromatic scale tone letter on said second surface of said first overlay aligns with a lead note indicia on said first surface of said base, said selectively indicated fingering positions for playing the selected music scale in the selected tonic and for each other music scale in its respective particular tonic being indicated wherever a chromatic tone letter overlays a fingering pattern indicia;

a second overlay having a third flat surface in parallel relation with said first flat surface of said base, said second overlay being constructed of a material which permits seeing through said second overlay so that said third flat surface of said second overlay, said second flat surface of said first overlay and said first flat surface of said base may be simultaneously seen, said third flat surface of said second overlay having a third indicia placed thereon indicating chord indicia, said chord indicia being arranged in conventional number system sequence in which each said chord indicia is assigned a number, a predetermined one of said chord indicia being designated as a root chord indicia, said second overlay being slidably moved relative to said first overlay and said base so as to align said root chord indicia with a selected one of said selected tonics as selected by said slidable movement of said first overlay relative to said base, a playable note for playing a chord being selected wherever a chord indicia aligns with a chromatic scale tone letter that has overlaid a fingering pattern indicia; and attachment means connected with said base for attaching said first and second overlays to said flat surface of said base so that said second flat surface of said first overlay and said third flat surface of said second overlay may be independently selectively slid relative to said first flat surface of said base.

2. The chord progression finder of claim 1, wherein fingering positions for playing the pre-selected musical instrument is indicated wherever a chord indicia aligns with a chromatic scale tone letter that has overlaid a fingering pattern indicia.

3. The chord progression finder of claim 2, wherein said root chord indicia is that chord indicia having assigned to it the number one.

4. The chord progression finder of claim 3, wherein each fingering pattern of said fingering patterns on said base is a fingering pattern for each pre-selected music scale of said pre-selected music scales arranged in sequence of playing selected scale notes from the chromatic scale on said finger board of said pre-selected musical instrument.

5. The chord progression finder of claim 4, wherein said pre-selected music scales comprise seven music scales; further wherein said fingering patterns comprise fingering patterns for Major, Minor, Locrian, Mixolydian, Lydian, Phrygian, and Dorian music scales.

6. The chord progression finder of claim 5, wherein said pre-selected musical instrument is selected from the group consisting of string instruments, brass and woodwind instruments and percussion instruments.

7. The chord progression finder of claim 6, wherein said pre-selected musical instrument is selected from the group consisting of guitar, alto-saxophone and piano.

8. A chord progression finder, comprising:

a base having a first flat surface, said first flat surface having a first indicia placed thereon indicating fingering patterns for playing pre-selected music scales in selected tonics on a pre-selected musical instrument, said pre-selected music scales comprising Major, Minor, Mixolydian, Phrygian, Locrian, Lydian and Dorian music scales, said first indicia comprising fingering indicia for indicating fingering patterns for playing said pre-selected music scales on said pre-selected musical instrument and lead note indicia for indicating a lead note location of each fingering pattern of said fingering patterns for each said pre-selected music scale of said pre-selected music scales;

a first overlay having a second flat surface positioned in parallel relation with said first flat surface of said base; said first overlay being constructed of a material which permits seeing through said first overlay so that said second flat surface of said first overlay and said first flat surface of said base may be simultaneously seen, said second flat surface of said first overlay having a second indicia placed thereon indicating a simulated finger board of said pre-selected musical instrument, said simulated finger board indicating fingering positions for said pre-selected musical instrument, said second indicia further indicating a chromatic scale tone letter for each fingering position of said fingering positions for said pre-selected musical instrument, the chromatic scale tone letters being arranged in chromatic scale sequence, said first overlay being slidably moved relative to said base so as to indicate fingering positions for playing a selected music scale of said pre-selected music scales in a selected tonic on said simulated finger board of said pre-selected musical instrument, said selected tonic for said selected music scale being selected by sliding said first overlay relative to said base until a selected chromatic scale tone letter that defines said tonic on said first overlay aligns with a selected lead note indicia that indicates the selected scale on said base, selection of said selected tonic for the selected music scale also simultaneously selecting a particular tonic respectively for each other music scale of said pre-selected music scales, a tonic being selected wherever a chromatic scale tone letter on said second surface of said first overlay aligns with a lead note indicia on said first surface of said base, the selectively indicated fingering position for playing the selected music scale in the selected tonic and for each other music scale in its respective particular tonic being indicated wherever a chromatic scale tone letter overlays a fingering pattern indicia;

a second overlay having a third flat surface in parallel relation with said first flat surface of said base, said second overlay being constructed of a material which permits seeing through said second overlay so that said third flat surface of said second overlay, said second flat surface of said first overlay and said first flat surface of said base may be simultaneously seen, said third flat surface of said second overlay having a third indicia placed thereon indicating chord indicia, said chord indicia being arranged in conventional number system sequence in which each said chord indicia is assigned a number, a predetermined one of said chord indicia being designated as a root chord indicia, said second overlay being slidably moved relative to said first overlay and said base so as to align said root chord indicia with a selected one of said selected tonics as selected by said slidable movement of said first overlay relative to said base, a playable note for playing a chord being selected wherever a chord indicia aligns with a chromatic scale tone letter has overlaid a fingering pattern indicia; and attachment means connected with said base for attaching said first and second overlays to said flat surface of said base so that said second flat surface of said first overlay and said third flat surface of said second overlay may be independently selectively slid relative to said first flat surface of said base.

9. The chord progression finder of claim 8, wherein fingering positions for playing the pre-selected musical instrument is indicated wherever a chord indicia aligns with a chromatic scale tone letter that has overlaid a fingering pattern indicia.

10. The chord progression finder of claim 9, wherein said root chord indicia is that chord indicia having assigned to it the number one.

11. The chord progression finder of claim 10, wherein each fingering pattern of said fingering patterns on said base is a fingering pattern for each pre-selected music scale of said pre-selected music scales arranged in sequence of playing selected scale notes from the chromatic scale on said finger board of said pre-selected musical instrument.

12. The chord progression finder of claim 11, wherein said pre-selected musical instrument is selected from the group consisting of string instruments, brass and woodwind instruments and percussion instruments.

13. The chord progression finder of claim 12, wherein said pre-selected musical instrument is selected from the group consisting of guitar, alto-saxophone and piano.

14. A method for finding notes for playing chords with respect to a selected musical instrument for a selected music scale in a selected tonic and simultaneously for at least two other music scales in a particular respective tonic, comprising the steps of:

placing fingering patterns for playing at least three pre-selected music scales in selected tonics on a pre-selected musical instrument onto a base, said fingering patterns comprising fingering indicia for indicating fingering patterns for playing each pre-selected music scale of said pre-selected music scales, said fingering patterns further comprising lead note indicia for indicating a lead note location of each fingering pattern of said fingering patterns for each said pre-selected music scale of said pre-selected music scales;

placing a simulated finger board indicia onto a transparent first overlay, said simulated finger board indicia indicating fingering positions for said pre-selected musical instrument, a chromatic scale tone letter being provided for each said fingering position, the chromatic scale tone letters being arranged in chromatic scale sequence;

placing chord indicia on a second transparent overlay, said chord indicia being arranged in conventional number system sequence in which each said chord indicia is assigned a number, a predetermined one of said chord indicia being designated as a root chord indicia;

aligning said first overlay relative to said base so as to align a selected chromatic scale tone letter that defines said selected tonic on said first overlay with a selected lead note indicia that indicates the selected music scale on said base, selection of said selected tonic for the selected music scale also simultaneously selecting a particular tonic respectively for each other music scale of said pre-selected music scales, a tonic being selected wherever a chromatic scale tone letter of said chromatic tone letters on said second surface of said first overlay aligns with a lead note indicia on said first surface of said base, the selectively indicated fingering positions for playing said pre-selected musical instrument being indicated for the selected music scale in the selected tonic and for each other music scale in its respective particular tonic wherever a tone letter indicia overlays a fingering pattern indicia; and aligning said root chord indicia with at least one selected tonic of said selected tonics as selected by said aligning of said first overlay relative to said base, a playable note for playing a chord being selected wherever a chord indicia aligns with a chromatic scale tone letter that has overlaid a fingering pattern indicia.

15. The method for finding notes for playing chords of claim 14 further comprising finding fingering positions for playing the pre-selected musical instrument wherever said chord indicia aligns with a chromatic scale letter that has overlaid a fingering pattern indicia.

16. The method for finding notes for playing chords of claim 15, wherein the first step of placing further provides for each fingering pattern of said fingering patterns on said base having a fingering pattern for each pre-selected music scale of said pre-selected music scales arranged in sequence of playing selected scale notes from the chromatic scale on said finger board of said pre-selected music instrument.

17. The method for finding notes for playing chords of claim 16, wherein the first said step of placing provides fingering patterns for Major, Minor, Locrian, Mixolydian, Lydian, Phrygian, and Dorian music scales; said first step of aligning results in a respective tonic being selected for each said pre-selected music scale; and said first step of aligning providing a fingering pattern for each said pre-selected music scale in its said respective tonic, and said second step of aligning providing a fingering pattern for playing chords for each of said pre-selected music scales in its respective tonic.

18. The method for finding notes for playing chords of claim 17, wherein the first step of placing provides fingering indicia and the second step of placing provides simulated fingering board indicia for a preselected musical instrument selected from the group consisting of string instruments, brass and woodwind instruments and percussion instruments.

19. The method for finding notes for playing chords of claim 18, wherein the first step of placing provides fingering indicia and the second step of placing provides simulated fingering board indicia for a preselected musical instrument selected from the group consisting of guitar, alto-saxophone and piano.

* * * * *